(12) United States Patent
Stamm et al.

(10) Patent No.: US 6,918,554 B2
(45) Date of Patent: Jul. 19, 2005

(54) TAPE CARTRIDGE FORMAT IDENTIFICATION IN A SINGLE REEL TAPE HANDLING DEVICE

(75) Inventors: Stephen Stamm, Fort Lupton, CO (US); James J. Kuhar, Broomfield, CO (US); Michael Barrell, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 44 days.

(21) Appl. No.: 10/357,870

(22) Filed: Feb. 4, 2003

(65) Prior Publication Data

US 2003/0173438 A1 Sep. 18, 2003

Related U.S. Application Data

(60) Provisional application No. 60/364,330, filed on Mar. 14, 2002.

(51) Int. Cl.[7] .............................................. G11B 23/04
(52) U.S. Cl. ....................... 242/338; 242/348; 242/357; 360/69
(58) Field of Search ................................ 242/357, 338, 242/344, 348; 360/69, 132

(56) References Cited

U.S. PATENT DOCUMENTS

| | | | |
|---|---|---|---|
| 4,843,490 A | 6/1989 | Haragushi | 360/69 |
| 4,863,114 A | 9/1989 | Moeller et al. | 242/188 |
| 5,327,305 A | 7/1994 | Thomas | 360/74.5 |
| 5,448,426 A | 9/1995 | Dahlerud | 360/69 |
| 5,608,584 A | 3/1997 | Steinberg et al. | 360/69 |
| 5,790,337 A | 8/1998 | Steinberg et al. | 360/69 |
| 6,305,630 B1 | 10/2001 | Argento | 242/341 |
| 6,360,979 B1 | 3/2002 | Larson | 242/332.4 |
| 6,439,489 B1 | 8/2002 | Hoge | 242/332.4 |

*Primary Examiner*—John Q. Nguyen
(74) *Attorney, Agent, or Firm*—Morrison & Foerster LLP

(57) ABSTRACT

Methods and apparatuses for identifying a single reel tape cartridge format, in a single reel tape handling device, from a plurality of available formats. According to one aspect of the invention, cartridge identification information is provisioned on a single reel tape cartridge leader. The cartridge identification information is detectable by the tape handling device and usable to identify a format of the tape cartridge from a plurality of available formats. The cartridge identification information includes at least one feature on the tape cartridge leader having characteristics indicative to the tape handling device of the format of the tape cartridge presented to the tape handling device.

18 Claims, 6 Drawing Sheets

500

| APERTURE COMBINATION | DISTANCE | MEDIA TYPE |
|---|---|---|
| 400, 402 | D1=1; D2=2 | M1 |
| 400, 404 | D1=2; D2=1 | M2 |
| 400, 408 | D1=3; D2=3 | M3 |
| 400, 410 | D1=3; D2=4 | M4 |
| 400, 412 | D1=3; D2=5 | M5 |
| 402, 404 | D1=1; D2=1 | M6 |
| 402, 408 | D1=2; D2=3 | M7 |
| 402, 410 | D1=2; D2=4 | M8 |
| 402, 412 | D1=2; D2=5 | M9 |
| 404, 408 | D1=1; D2=3 | M10 |
| 404, 410 | D1=1; D2=4 | M11 |
| 404, 412 | D1=1; D2=5 | M12 |
| 408, 410 | D1=3; D2=1 | M13 |
| 408, 412 | D1=3; D2=2 | M14 |
| 410, 412 | D1=4; D2=1 | M15 |

*FIG. 5*

TAPE CARTRIDGE FORMAT IDENTIFICATION IN A SINGLE REEL TAPE HANDLING DEVICE

RELATED APPLICATIONS

This patent application claims priority from U.S. patent application Ser. No. 60/364,330 that was filed on Mar. 14, 2002 and that is entitled "TAPE MEDIA VERSION DETECTION." The entire disclosure of U.S. Patent Application Ser. No. 60/364,330 is incorporated herein by reference.

FIELD OF THE INVENTION

The invention is related to the field of tape handling devices, and in particular, to tape cartridge format identification in a tape handling device.

BACKGROUND OF THE INVENTION

Digital data is stored on tape cartridges that include a magnetic tape media wound between a pair of tape reels as data is transferred to or from the media. The physical space required to store data on tape cartridges is an important concern. To conserve space, tape handling devices often use a single reel cartridge design, which utilizes a tape reel located within a removable tape cartridge and a tape reel located within the tape handling device.

According to this characterization, after a tape cartridge is inserted into the tape handling device, e.g., a tape drive, the tape media must be loaded into the drive from the cartridge. The loading operation includes connecting the tape media to the tape reel in the drive, typically referred to as a take-up reel, and winding the tape media to a start point or read/write position.

Various methods have been employed to perform this connection operation. One such method utilizes a leader connected to the tape media ("tape cartridge leader") that is designed to connect, e.g., via a buckle connection, to a leader connected to the take-up reel ("take-up leader"). After connection, the buckled leaders are wound through a tape path and around the take-up reel until the beginning of the tape media is in a read/write position relative to a tape head. It will be appreciated, that such operation requires a method for identifying, in the drive, the beginning of the tape media. One such method to identify the beginning of the tape media is a beginning of tape (BOT) aperture or hole. BOT apertures are formed in the beginning of the tape media, typically by the tape cartridge manufacturer, and are detectable by the drive to identify the same to the drive. Similarly, an end of tape (EOT) aperture may be included proximate the end of the tape media to identify the end of the tape to the drive.

Presently, there are numerous commercially available tape cartridges having various different formats or characteristics, such as tape thickness, track pitch, maximum recording densities, coercivity, etc. As the number of tape cartridge formats increases, format detection is of increasing importance, both to protect tape cartridges from damage, as well as to protect tape drives from damage, due to incompatibility.

One conventional approach to prevent incompatibility problems is to provide a feature or "key" on the cartridge housing that only permits insertion of the cartridge into one particular drive type, and prevents insertion of the cartridge into other drive types. Unfortunately, this presents special design challenges during the development of new drive and cartridge formats. Consider the case where a manufacturer desires to build a new drive compatible both with a new cartridge and an existing cartridge that includes a compatibility key. If the old cartridge is compatible with both the new and current drives, but the new cartridge is only compatible with the new drive, the new cartridge must have a feature to prevent use in the current drive, while the new drive must be designed to accommodate both the current and new compatibility features.

Another solution to the above problem is to provide a tape type hole in the tape media to identify a cartridge type to a drive. Unfortunately, however, to identify more than a few tape cartridge types, requires the use of multiple holes along an interval of the media, thereby utilizing areas of the media that would otherwise be usable for data storage. A related problem with the provisioning of one or more holes in the tape media is localized weakening of the tape structurally, leaving it susceptible to stretching or tearing. Still another problem with the provisioning of holes, is that pressure generated by the winding of the successive layers of tape can result in an imprint in adjacent portions of the tape. These imprints result in track distortion and can cause portions of the tape to become unreadable by the drive. In particular, imprints create a gap between the tape media and the tape head during reading, such that the head is unable to read from the imprinted area.

Yet another problem with provisioning holes in tape media is debris generated during spooling of the media through the tape path. In this case, the holes provide a non-uniform point of contact between the media and components of the tape path (e.g., the tape head) that can cause portions of the media to "flake" off in the region of the hole, resulting in debris within the tape handling device and a weakened area on the tape media. Such debris is highly undesirable as it may affect the operation of other components including the tracking of the media through the tape path. Yet another problem with provisioning of holes in the tape media is related to the desirability of producing tape media in a thinner form factor. Such media is more susceptible to the above-described problems of damage and debris.

SUMMARY OF THE INVENTION

In view of the foregoing, a broad object of the present invention is to improve cartridge identification in tape handling devices. Another object of the present invention is to reduce damage to tape cartridges and tape handling devices due to incompatibility. Another object of the present invention is to provide information on a tape cartridge leader that is indicative of a particular cartridge format from a plurality of available cartridge formats. Another object of the present invention is to improve cartridge reliability, e.g., through minimization of features other than data included on the media of a tape cartridge. A related object of the present invention is to provide a tape cartridge leader that includes at least one feature that quickly identifies the particular cartridge format to a tape handling device.

In the context of the present invention, the tape information included on a tape cartridge leader may be any information that is detectable by a tape handling device and usable by the device to determine the format of a presented tape cartridge. Also in the context of the present invention, a tape handling device may include any device for handling tape cartridges including without limitation, tape drives, tape libraries, tape cartridge autoloaders, and tape cartridge autoloader/libraries.

In carrying out the above objects, and other objects, features, and advantages of the present invention, a method for determining, in a tape handling device, a format of a single reel tape cartridge from a plurality of potential formats is provided. The method includes the steps of receiving a tape cartridge in a tape handling device, obtaining information from a tape cartridge leader connected to a tape media of the tape cartridge, and identifying a particular format of the tape cartridge from a plurality of potential formats, using the information.

Various refinements exist of the features noted in relation to the subject method. Further features may also be incorporated into the subject method to form multiple examples of the present invention. These refinements and additional features will be apparent from the following description and may exist individually or in any combination. For instance, the method may include the steps of determining that the tape cartridge is incompatible with the tape handling device and ejecting the tape cartridge from the tape handling device. According to this characterization, the determining step and ejection step may be performed prior to winding the media past a tape head to protect the cartridge and tape handling device from damage due to incompatibility. Similarly the method may include the steps of determining the tape cartridge is compatible with the tape handling device, and winding the tape media from the tape cartridge to a read/write position adjacent the tape head.

In another instance, the identifying step may include identifying a layout of the tape cartridge, e.g., length of tape media contained in the cartridge etc., using the information. Similarly, the identifying step may include identifying a format of the tape media, e.g., tape thickness, track pitch, maximum recording densities, coercivity, etc., using the information. According to this characterization, the information may include any feature(s) on a tape cartridge leader that is detectable by a tape handling device and usable by the device to determine the format of the presented tape cartridge. For instance, the tape handling device may utilize a quantity, type and/or location of one or more features provisioned on or in a tape cartridge leader to determine the cartridge format.

In one particular example, the information may be a feature that is utilized by the tape handling device to determine a distance between the feature and another point of reference on the leader. The determined distance in turn indicates a format of the tape cartridge to the tape handling device. In another example, the information may be at least two features utilized to determine at least two distances that indicate a cartridge format to the tape handling device. Some examples of features that may be included on a tape cartridge leader include without limitation, apertures, light transmitting geometries, reflective areas, servo patterns etc.

In carrying out the above objects, and other objects, features, and advantages of the present invention, a single reel tape cartridge leader is provided. The tape cartridge leader includes an elongated body connectable to a tape media at a first end, a connector disposed on a second end for detachably connecting to a take-up leader in a tape handling device, and information to identify a tape cartridge format to a tape handling device.

Various refinements exist of the features noted in relation to the subject tape cartridge leader. Further features may also be incorporated into the subject leader to form multiple examples of the present invention. These refinements and additional features will be apparent from the following description and may exist individually or in any combination. For instance, the as with the above aspect, the information may identify a layout of the tape cartridge, e.g., length of tape media etc., and/or a format of the tape media, e.g., tape thickness, track pitch, maximum recording densities, coercivity, etc. Furthermore, as with the above aspect, the information may include any feature(s) on a tape cartridge leader that is detectable by a tape handling device and usable by the device to determine a particular format of a presented tape cartridge. For instance, the tape handling device may utilize a quantity, type and/or location of one or more features to determine a cartridge format.

In carrying out the above objects, and other objects, features, and advantages of the present invention, a single reel tape cartridge is provided. The cartridge comprises a cartridge housing, a tape reel rotatably mounted within the cartridge housing, tape media wound around the tape reel, and a tape cartridge leader connected to the tape media and including information to identify a format of the tape cartridge to a tape handling device. Various refinements exist of the features noted in relation to the subject tape cartridge. Further features may also be incorporated into the subject cartridge to form multiple examples of the present invention. These refinements and additional features will be apparent from the following description and may exist individually or in any combination with those described above.

In carrying out the above objects, and other objects, features, and advantages of the present invention, a method of preventing damage to one of a tape handling device and a single reel tape cartridge due to incompatibility is provided. The method includes the steps of: receiving the tape cartridge in the tape handling device, connecting the tape cartridge leader to the tape handling device, sensing information on the tape cartridge leader, using the information to determine if the cartridge is compatible with the tape handling device, and if the cartridge is incompatible rejecting the tape cartridge from the device.

Various refinements exist of the features noted in relation to the subject method. Further features may also be incorporated into the subject method to form multiple examples of the present invention. These refinements and additional features will be apparent from the following description and may exist individually or in any combination those described above. For instance, the determining step and ejection step may be performed prior to winding the media past a tape head to protect the cartridge and tape handling device from damage due to incompatibility. In another instance, the method may include the step of winding the tape media to a read/write position adjacent the tape head if the cartridge is incompatible.

In carrying out the above objects, and other objects, features, and advantages of the present invention, a data storage system is provided. The system comprises a tape handling device and a plurality of single reel tape cartridges. The tape cartridges each include a tape cartridge leader having information to identify a format of the tape cartridge to the tape handling device. The tape handling device is configured to detect the information and determine the format of a presented tape cartridge from a plurality of potential formats. Various refinements exist of the features noted in relation to the subject system. Further features may also be incorporated into the subject system to form multiple examples of the present invention. These refinements and additional features will be apparent from the following description and may exist individually or in any combination those described above.

In carrying out the above objects, and other objects, features, and advantages of the present invention, a tape handling device is provided. The tape handling device includes a processor; a sensing system; cartridge format identification software, and a software storage medium. The cartridge identification software is operational when executed on the processor to direct the sensing system to obtain information from a tape cartridge leader; and identify a format of the tape cartridge from a plurality of potential formats using the information. The software storage medium is operational to store the cartridge format identification software.

Various refinements exist of the features noted in relation to the subject device. Further features may also be incorporated into the subject device to form multiple examples of the present invention. These refinements and additional features will be apparent from the following description and may exist individually or in any combination those described above. For instance, the software may be operational when executed on the processor to determine the tape cartridge is incompatible with the tape handling device and cause the tape handling device to eject the tape cartridge. In another instance, the software may be operational when executed on the processor to determine the tape cartridge is incompatible with the tape handling device prior to winding the tape media past a tape head in the device. In another instance, the software may be operational when executed on the processor to determine the tape cartridge is compatible with the tape handling device and cause the tape handling device to wind the tape media from the tape cartridge to a read/write position adjacent the tape head. In another instance, the software may be operational when executed on the processor to measure a distance between a first and second sensed feature on the tape cartridge leader and identify the tape cartridge based on the distance. In another instance, the software may be operational when executed on the processor to measure at least two distances on the tape cartridge leader, and identify the tape cartridge based on the at least two distances. Furthermore, additional aspects, advantages and applications of the present invention will be apparent to those skilled in the art upon consideration of the following.

BRIEF DESCRIPTION OF THE DRAWINGS

FIG. 5 is an example of a logical table illustrating an example of an operational protocol according to the present invention.

DETAILED DESCRIPTION

Reference will now be made to the accompanying drawings, which at least assist in illustrating the various pertinent features of the present invention. In this regard, the following description of a tape handling device is presented for purposes of illustration and not limitation. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application (s) or use(s) of the present invention.

Figure 1:
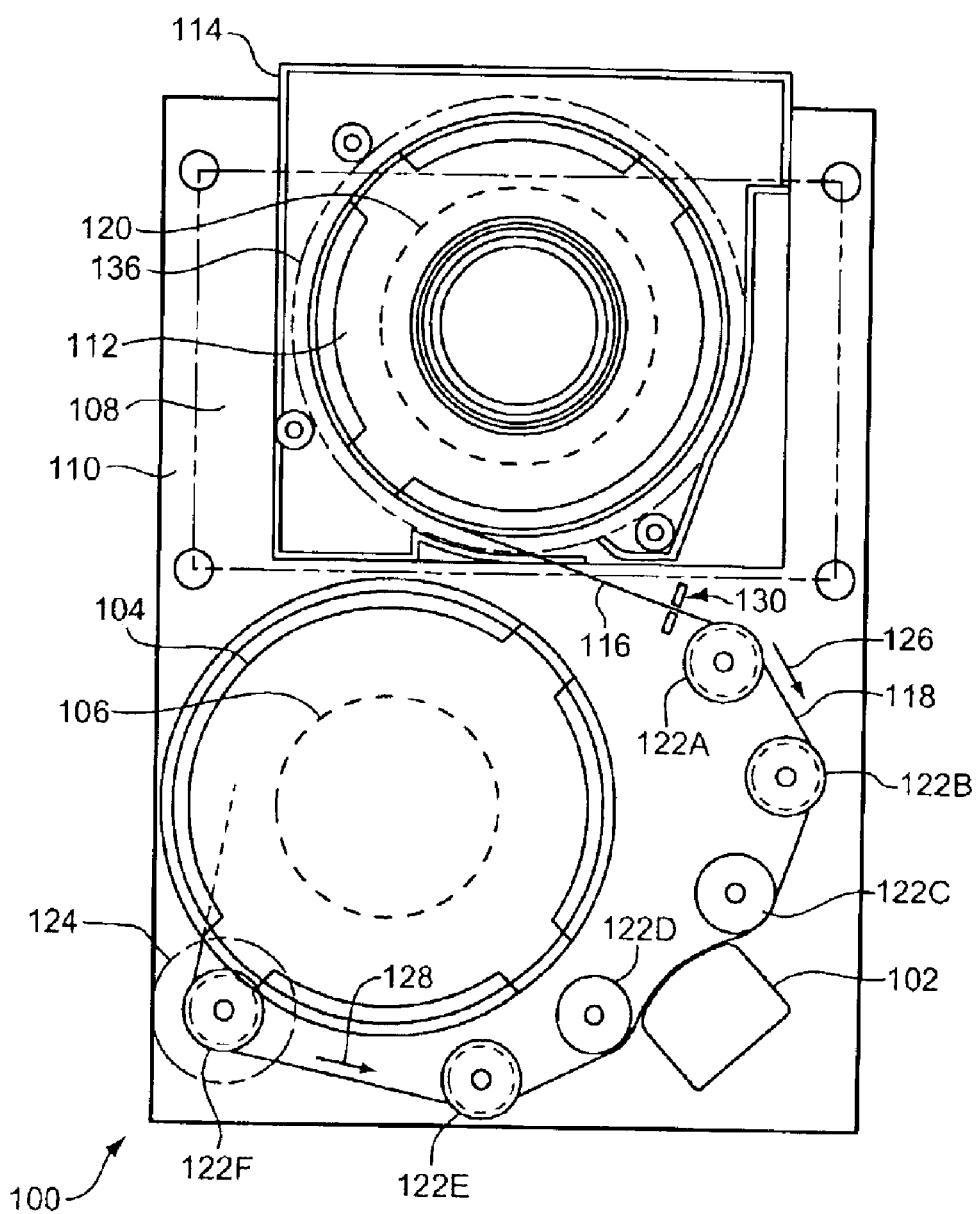
FIG. 1 illustrates an example of a tape handling device and tape cartridge employing the principles of the present invention.

FIG. 1 depicts an example of a tape handling device, namely tape drive 100. The tape drive 100 includes a tape head 102, a tape cartridge receiver 108, and an internal take-up reel 104 driven by a take-up reel drive motor 106. These elements are contained within a housing 110. Magnetic recording tape 112 of a predetermined particular type is provided to the tape drive 100 by insertion of a tape cartridge 114 into the cartridge receiver 108. After insertion of the tape cartridge 114, an automatic loading process is performed in the tape drive 100. The loading process is representative of connecting, e.g., through a buckle connection, a tape cartridge leader 116 to a take-up leader 118. The tape cartridge leader 116 is connected to the tape media 112, while the take-up leader 118 is connected to the take-up reel 104. In this manner, the tape cartridge leader 116 and take-up leader 118 are utilized to load the tape media 112 from the tape cartridge 114 into the tape drive 100, and specifically, past the tape head 102 for read and/or write operations. More specifically, the connected leaders, 116 and 118, followed by the tape media 112 are spooled off of a cartridge supply reel 120 onto the take-up reel 104 via the tape path defined by guide rollers 122A–F and including the tape head 102.

The tape drive 100 may be configured with one or more of the following components that may be utilized to detect cartridge identification information on the tape cartridge leader 116. In this regard, one of the tape guide rollers, e.g., roller 122F, may be coupled to an optical tachometer encoder disk 124. The tachometer 124 generates signal patterns or counts in relation to actual velocity of the tape media 112 in the forward direction 126 and reverse direction 128. An optical sensing module 130 including a light source and detector may also be included in the tape drive 100. Preferably, the optical sensing module 130 is located proximate the connection location of the leaders 116 and 118, e.g., between tape guide roller 122A and the tape cartridge 114. As will be appreciated, this provides the advantage of early cartridge format identification. Specifically, this provides the advantage of ensuring cartridge format identification prior to winding the media 112 past the tape head 102, which may result in damage to the cartridge 114 and/or the drive 100, if the cartridge 114 is incompatible with the drive 100. This protects both the media 112 and tape head 102 from exposure to incompatible formats, as the cartridge 114 is preferably immediately ejected from the drive 100, if the format is determined incompatible. Alternatively, however, the optical sensing module 130 may be positioned anywhere along the tape path as a matter of design choice.

In addition to the above-described sensors, the take-up reel motor 106 and supply reel motor 136, may include hall sensors (not shown) that generate a hall count relative to the motor velocity. As will be described below the hall sensors as well as any one of the above-described components may be utilized to detect and/or make use of cartridge identification information on the tape cartridge leader 116. Alternatively, those skilled in the art will further appreciate numerous other components, e.g., magnetic sensors, that may be incorporated into the tape drive 100, as a matter of design choice, to detect and/or make use of cartridge identification information on the leader 116. It will also be appreciated by those skilled in the art that some of the above-described components may already be included in a tape drive, such as drive 100, such that only the firmware need be changed to configure the drive 100 to operate according to the principles of the present invention.

Figure 2:
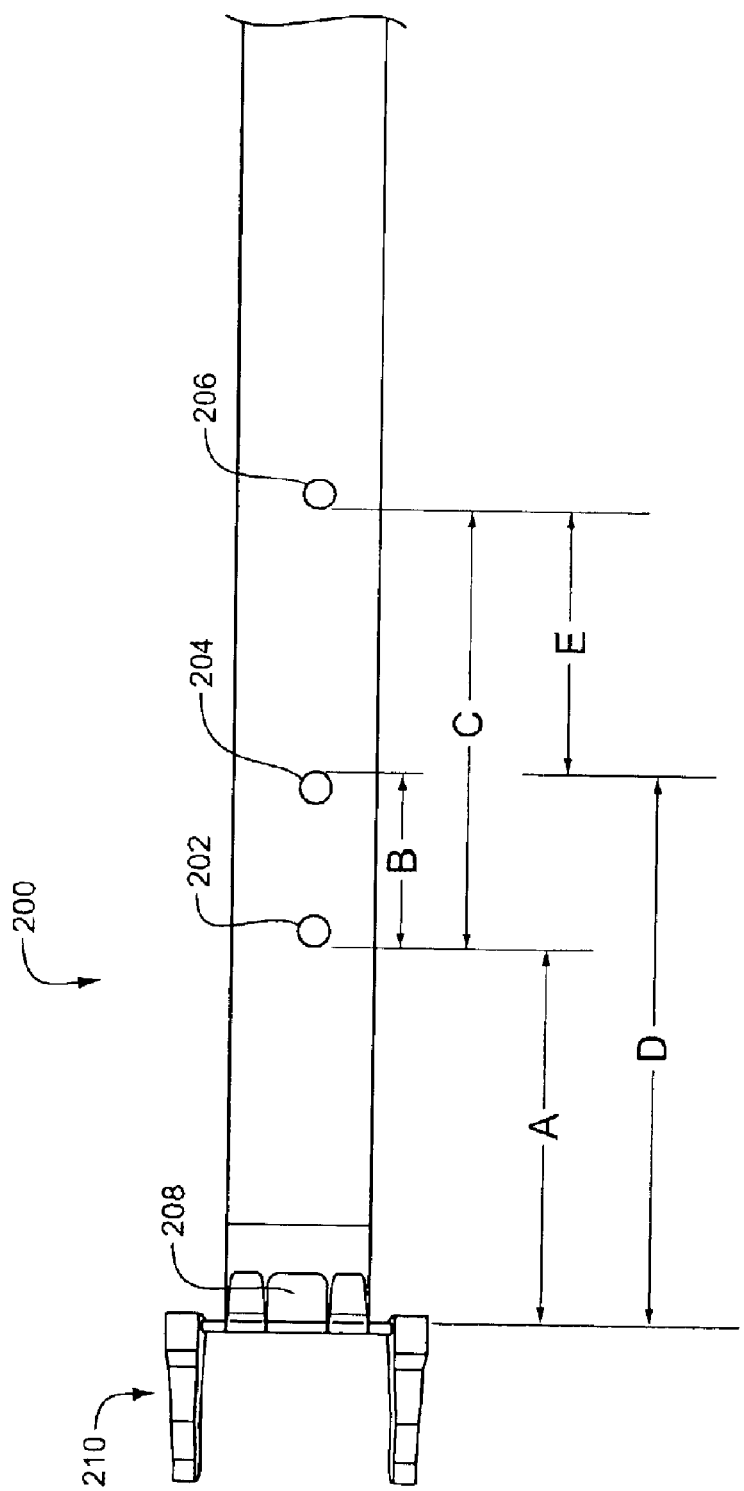
FIG. 2 illustrates an example of a tape cartridge leader employing the principles of the present invention.

FIG. 2 depicts one example of a tape cartridge leader 200 configured with cartridge identification information in the form of apertures, e.g., apertures 202, 204 and/or 206. It should be noted that, as a matter of design choice, the cartridge identification information may comprise only a single aperture, e.g., 202, provisioned in the leader 200. Alternatively, however, the cartridge identification information may comprise multiple apertures, e.g., 202, 204, and/or 206 provisioned in the leader 200. The cartridge identification information identifies to the tape drive 100 the specific format of a tape cartridge, such as cartridge 114, from a plurality of potential formats of tape cartridges. In the context of the present invention, the term format includes at least cartridge layout information as well as media format and may include other information as well. Also in the context of the present invention, the cartridge layout information may include information related to length of tape media included in the cartridge, cartridge type, etc., while the media format information may include characteristics of the media 112 such as track density, pitch, and/or coercivity, etc.

In one example of the present invention, the leader 200 may include only a single aperture 202, which is provisioned in the leader 200 at a predetermined distance from a conventional, but detectable feature, of the leader 200. For instance, the aperture 202 may be located a predetermined distance from the aperture 208. The aperture 208 is an aperture that is conventionally included on the leader 200 as a function of the leader design, e.g., connection of the buckle 210 to the leader 200. According to this characterization, the aperture 202 may be located at various predetermined distances from the aperture 208, which are measurable by the drive 100, to indicate a cartridge format to the drive 100. In other words, the leader 200 identifies the format of the cartridge 114 based on the distance (A) of the aperture 202 from the aperture 208. Accordingly, locating the aperture 202 at different locations along the leader 200 may be utilized to identify a plurality of tape cartridge formats to the drive 100. As will be further described below, the drive 100 may utilize one of the tachometer 124 or hall sensors in combination with the optical sensing module 130 to measure the distance (A) between the apertures 202 and 208.

In another example of the present invention, the leader 200 may be provisioned with multiple apertures, e.g., aperture 202 in addition to apertures 204 and 206. In this case, the drive 100 may utilize the provisioned apertures, e.g., 202, 204 and 206, alone or in combination with conventional features, e.g., aperture 208, to identify two or more distance measurements that indicate cartridge format. For instance, the apertures 202, 204, 206, and 208 define various distance combinations that may be utilized to indicate a cartridge format to the drive 100, e.g., distances (B) and (C), distances (A) and (C), and/or distances (B) and (E). It should be noted, that the features included on the leader 200, e.g., apertures 202, 204, 206, and 208, need not be identical in nature to identify cartridge format. Rather, what is important is that at least one or more combinations of features exist on the leader 200 by which a distance may be determined.

Figure 3:
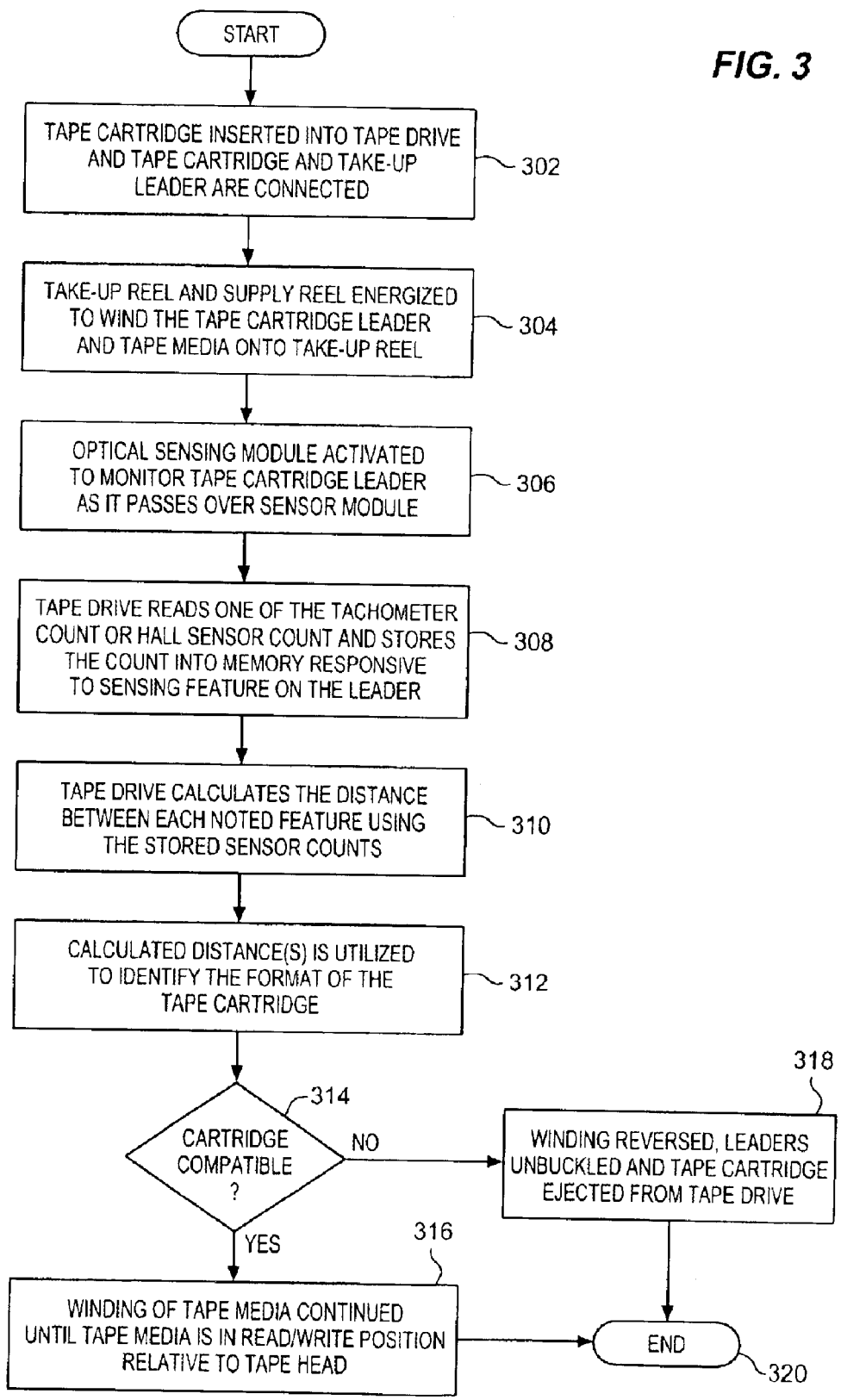
FIG. 3 is a flow chart illustrating one example of an operational protocol according to the present invention.

FIG. 3 illustrates one example of an operational protocol where the tape cartridge leader 116 is provisioned with at least one feature employable to ascertain a pair of distances that identify a tape cartridge format to the drive 100. On FIG. 3, the operation begins at step 300. At step 302, the tape cartridge 114 is inserted into the tape drive 100 and the tape cartridge leader 116 and take-up leader 118 are connected, e.g., via a buckle connection. At step 304, the take-up reel 104 and supply reel 120 are energized to wind the tape cartridge leader 116 and tape media 112 onto the take-up reel 104. At step 306, optical sensing module 130 is activated and monitors the tape cartridge leader 116, as the leader 116 passes over the sensor module 130. As indicated above, sensing module 130 may be a light sensor that indicates a change of state when one of the features, e.g., the aperture 202, is encountered. In this regard, sensor module 130 may be a closed circuit triggered by light from the light source passing through the aperture 202 and being detected by the photodetector of sensor module 130. Responsive to sensing the change in state at the sensing module 130, the tape drive 100 (e.g., using a microprocessor) reads one of the tachometer 124 count or hall sensor count and stores the count into memory at step 308. As the leader 200 is wound through the tape path, the position of each feature on the leader 200 is stored in memory. At step 310, the tape drive 100, calculates at least one distance between a noted feature and another noted feature using the stored sensor counts. The calculated distance(s) is then utilized by tape drive 100 to identify the format of the tape cartridge 114 at step 312. At step 314, the tape drive 100 determines if the cartridge format is compatible with the tape drive 100. If at step 314, the format is compatible, winding of the tape media 112 is continued, at step 316, until the tape media 112 is in a read/write position relative to the tape head 102, and the operation ends at step 320. If at step 314, the format is determined to be incompatible with the drive 100, the tape winding is reversed at step 318, the leaders 116 and 118 are unbuckled, and the tape cartridge 114 ejected from the tape drive 100 and the operation ends at step 320. It should be noted that step 318 is preferably performed prior to the winding of the tape media 112 past the tape head 102, as this minimizes the chance of damaging one of the media 112 or drive 100.

According to this characterization, the tape drive 100 may be programmed to display a message to a user upon rejection of the tape cartridge 114 indicating that the cartridge format is incompatible with the drive 100. Furthermore, it should be noted that the read/write position of the tape media 112, at step 316, may be determined according to the conventional method of detecting a BOT hole in the tape 112. Alternatively, however, and preferably, locating the media 112 in the read/write position adjacent the tape head 102 may be performed using the format information provided by the leader 116. For instance, once the cartridge format, e.g., layout, is known, the distance from one of the detected features, e.g., aperture 202, is also known and may be utilized to position the tape media 112 in the read position at step 316. In other words, once the format of the cartridge 114 is identified, and the cartridge 114 determined to be compatible with the tape drive 100, the winding may be continued a known distance from the location of the aperture 202 to position the tape media 112 in the read/write position adjacent the tape head 102. Advantageously, this eliminates the necessity of a BOT hole in the tape media 112 to differentiate the beginning of the tape media 112 from the tape cartridge leader 116. Those skilled in the art will appreciate the amount of real estate on the media 112 that may be freed up by the elimination of the BOT hole. For instance not only is the area in proximity to the BOT hole freed up, but also a significant amount of adjacent area is also freed up. Typically this adjacent area is kept free of data so that successive wraps of the media 112 can be made around the take-up reel 104 to minimize imprint from the BOT hole. In other words, the read/write position, which is typically located on the media 112, a significant distance from the BOT hole, may be moved substantially closer to the beginning of the media 112.

Figure 4:
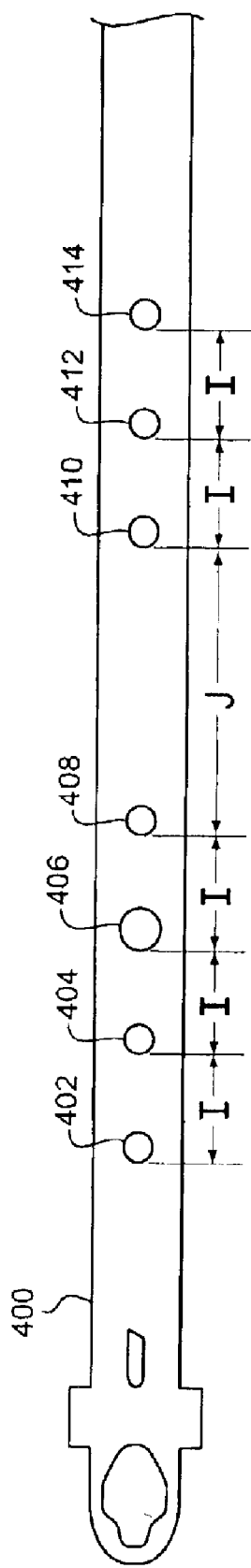
FIG. 4 illustrates another example of a tape cartridge leader employing the principles of the present invention.
Figure 6:
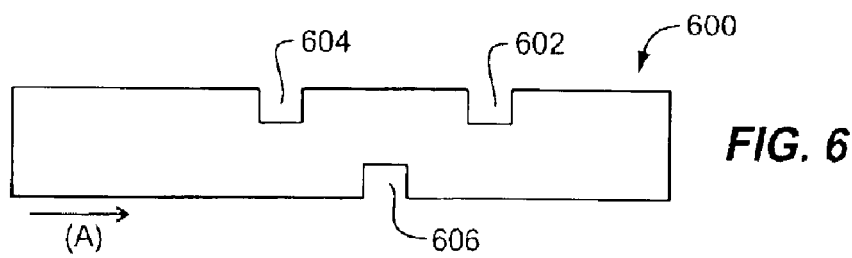
FIG. 6 illustrates another example of a tape cartridge leader employing the principles of the present invention.

FIG. 4 illustrates another example of the present invention wherein an existing conventional aperture, e.g., a "mushroom" aperture 406, in a single reel tape cartridge leader 400 is utilized in combination with other provisioned apertures. The mushroom aperture 406 is conventionally included on a leader of the type shown in FIG. 4 to compensate for the increased height resulting from the buckle with a corresponding take-up leader 118. In other words, the mushroom aperture 406 is utilized in the leader 400 to maintain a uniform winding of the leader 400 and media 112 around a take-up reel 120 to reduce imprint problems.

FIG. 4 illustrates multiple combinations of possible aperture patterns that may be provisioned on the leader 400 as a matter of design choice, to identify at least two distances to the tape drive 100. Of note in this regard, is that the use of at least two distances to identify the cartridge format provides the advantage of numerous combinations within a relatively small area of the leader 400 that may be utilized to identify a large variety of cartridge formats.

FIG. 5 depicts one example, namely logical table 500, of a logical association between distances and cartridge format using the leader 400 as an example. For purposes of illustration, the following example assumes that the distance (I) between apertures 400 and 402, apertures 402 and 404, apertures 404 and 406, apertures 408 and 410, and apertures 410 and 412 is equal to one inch and the distance (J) between the "mushroom" aperture 406 and the aperture 408 is three inches. In this regard, at least one method of defining distances is relative to the "mushroom" aperture 406.

On FIG. 5, if we assume that the leader 400 is only provisioned with apertures 404 and 402 in addition to the "mushroom" aperture 406, then a first distance D1 between apertures 404 and 402 is equal to one inch and a second distance D2 between aperture 402 and the "mushroom" aperture 406 is equal to two inches. In this regard, if a tape cartridge 114 having a leader 400 provisioned with apertures 404 and 402 in addition to the "mushroom" aperture 406 is provided to the tape drive 100, the drive 100 will recognize the distance combination as a cartridge format M1 as illustrated in logical table 500. Similarly, if we assume the leader 116 is provisioned with apertures 408 and 404 in addition to the "mushroom" aperture 406, then a first distance D1 between apertures 408 and 404 is equal to two inches and a second distance D2 between aperture 404 and the "mushroom" aperture 406 is equal to one inch. In this regard, if a tape cartridge 114 having a leader 400 provisioned with apertures 408 and 404 in addition to the "mushroom" aperture 406 is provided to the tape drive 100, the drive 100 will recognize the distance combination as a media type M2 as illustrated in logical table 500. As further illustrated in FIG. 5, at least fifteen different cartridge formats may be identified as a function of the provisioning of only two apertures relative to the "mushroom" aperture 406. As will be appreciated, additional apertures and distance determinations may be utilized as a matter of design choice to provide for identification of additional cartridge formats.

Referring to FIGS. 6–11, various embodiments of tape cartridge leaders including various forms of tape cartridge identification information are shown. As discussed above, it is useful to include cartridge identification information on a tape cartridge leader, with one example being an aperture(s), such as aperture 202. Of note, however, the cartridge identification information may be any information included on a cartridge leader, such as leader 116, that is usable by a drive, such as drive 100, to identify a cartridge format. Accordingly, FIGS. 6–11 present various alternative operational protocols and examples of cartridge identification information.

For instance in one alternative embodiment, it may be useful to utilize different features to identify different cartridge formats. In other words, a leader, such as leader 600, including notches 602, 604, and 606, may indicate to the tape drive 100 that the cartridge is a first format type, while a leader, such as leader 700, having slots 702, 704, 706, 708, may indicate to the drive 100 that the cartridge is a second format type. It should be noted in this regard, that one simple method of differentiating between different feature types, e.g., the notch 602 verses the slot 702, is by the different optical patterns generated by the sensing module 130 when the different features are encountered.

According to this characterization, it will be appreciated that only a single feature, such as notch 602 and slot 702, is required to distinguish between the first and second cartridge formats. However, the provisioning of a leader, such as leaders, 600 and 700, with a plurality of features that are arranged into an identifiable pattern may be useful to provide more detailed format information to the drive 100. For example, assuming a winding direction (A), the notch 602 of the leader 600 may provide an initial indication of cartridge format, while notch 606 provides verification that notch 602 is in fact a cartridge identification notch, as opposed to another leader feature, e.g., damaged leader, mushroom aperture, etc. Furthermore, notch 604 may be utilized in other operations such as locating the tape media 112, in for example, the read/write position relative to the tape head 102. In other words, once cartridge format is determined and verified, the notch 604 may be utilized to wind the leader 600 and media 112 a predetermined distance from the notch 604 that aligns the read/write position on the media 112 with the tape head 102.

In another example of the present invention, the location of the features on the leader may be utilized to determine a cartridge format. For instance, the location of a notch 602 in the top edge of the leader 600 may indicate a first cartridge format, while the location of the notch 606 in the bottom edge of the leader 600 may indicate a second cartridge format. In yet another example, the width of the notches, e.g., 600, 602, and 604 may also be varied to identify individual cartridge formats from a plurality of cartridge formats.

Figure 7:
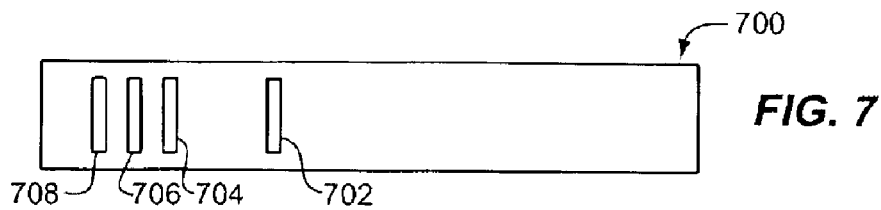
FIG. 7 illustrates another example of a tape cartridge leader employing the principles of the present invention.

FIG. 7 shows an example of a leader 700 provisioned with a plurality of vertical slots, e.g., slots 702, 704, 706, and 708. As with the above-described examples, the slots 702, 704, 706, and 708 may be utilized in a variety of methods to provide cartridge identification information to a tape drive such as tape drive 100. For instance, in addition to the above-described methods, the number of slots included on the leader 700 may be utilized to identify the cartridge format to the drive 100.

In another example according to this characterization, the slot 702 may be utilized to indicate to the drive 100 that cartridge identification information will follow. In this regard, the cartridge identification information may be the slots, 704, 706, and 708 and the drive 100 may utilize the quantity, spacing or distance between the slots 704, 706, and 708, or even the location of the slots 704, 706, and 708 on the leader 700 to identify a particular cartridge format.

Figure 8:
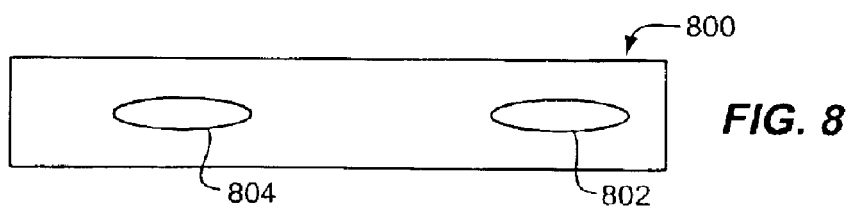
FIG. 8 illustrates another example of a tape cartridge leader employing the principles of the present invention.

Referring to FIG. 8 it will be appreciated that the geometric shape of a feature included on a cartridge leader, such as leader 800, may also be utilized to identify a cartridge format to a drive such as drive 100. For instance, the ovular shape of the apertures 802 and 804 may indicate a first cartridge format to the drive 100, while the rounded shape of the apertures, e.g., 202 and 204, of another leader such as leader 200, may indicate a second cartridge format.

It should be noted, that where features that affect the surface topography of a leader are utilized, for example, the apertures, 802 and 804, it is preferred that such features are located at a location on a leader, e.g., 800, that permits the final wrap of the leader 800 around the take-up reel 104 to cover the apertures, e.g., 802 and 804. While the features may be located anywhere on the leader 800, as a matter of design choice, the above described location is preferred to reduce imprinting of the shape of the features, e.g., apertures 802 and 804, into the tape media 112 as a result of winding pressures.

Figure 9:
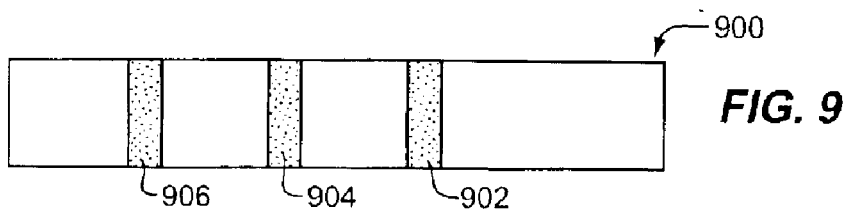
FIG. 9 illustrates another example of a tape cartridge leader employing the principles of the present invention.

FIG. 9 illustrates another example of cartridge identification information that may be included on a leader, e.g., leader 900. In this case, the cartridge identification information is in the form of features 902, 904, and 906 provisioned on the leader 900. In one example, the features 902, 904, and 906 may be light transmissive features that may be utilized according to any of the above-described protocols to indicate cartridge format to a drive, such as drive 100. In another example, the features 902, 904, and 906 may be light reflective features, such as a white stripe(s) printed on the leader 900. It should also be noted that features such as 902, 904, and 906 that do not affect the surface topology of the leader, have the advantage of minimizing imprint on the media 112 as the surface of the leader 900 remains unchanged, e.g., there are no indents or apertures that may cause imprints under winding pressure.

Figure 10:
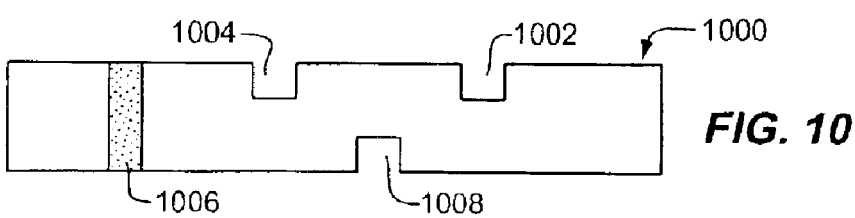
FIG. 10 illustrates another example of a tape cartridge leader employing the principles of the present invention.

FIG. 10 illustrates another example of cartridge identification information that may be included on a leader, e.g., leader 1000. In this case, the cartridge identification information is a combination of notches, e.g., notches 1002, 1004, and 1008, and light transmissive feature(s), e.g., feature 1006.

Figure 11:
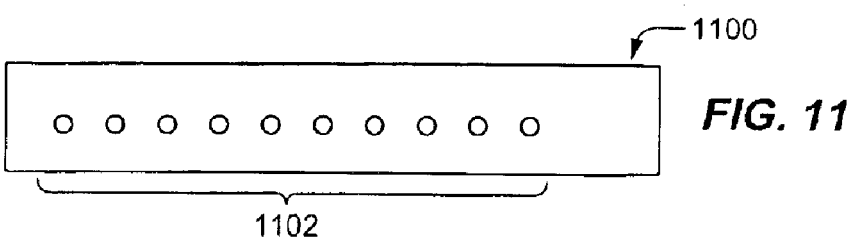
FIG. 11 illustrates another example of a tape cartridge leader employing the principles of the present invention.

FIG. 11 illustrates another example of cartridge identification information that may be included on a leader, e.g., leader 1100. In this case, the cartridge identification information may be a pattern 1102 that is provisioned in the leader 1100. In this regard, the pattern 1102 may be similar to a servo pattern provisioned in the tape media 112 and utilized for track alignment. In this regard, the pattern 1102 may be a pattern that is provisioned in only one side of the leader 1100, such that the apertures of the pattern 1102 do not pass through the leader 1102, but are formed only in one side of the leader 1100, such as by a laser. Advantageously, according to this characterizing, numerous patterns may be utilized to identify various cartridge formats to a tape drive such as drive 100. Yet another advantage according to this characterization is that print through issues are minimized as the features of the pattern 1102 are typically on the order of micron sized features and do not pass through the leader 1100.

Those skilled in the art will appreciate various additional advantages to employing various types of cartridge identification information in a tape cartridge leader. For instance, as new cartridge formats are developed, drives, such as the drive 100, do not need to be redesigned to accommodate new cartridges. Rather, only modification of the software and/or firmware of a drive, such as drive 100, need be made to permit the drive 100 to accept the new cartridge design. Similarly, simple reprogramming of the software and/or firmware may be utilized to prevent the drive 100 from accepting a tape cartridge that is not compatible with the drive 100. In another instance, the present invention increases available real estate on the media 112 by eliminating the need for BOT holes and the associated distance to the read/write position required to minimize imprint from such BOT holes. Related advantages to this include improved structural integrity of the media 112 by the elimination of such holes, as well as reduced debris generation during drive operation. It will be appreciated that all of the above advantages further result in improved cartridge reliability through improvements to media durability.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processing devices are integrated circuits and logic circuitry. Those skilled in the art are familiar with instructions, computers, and storage media.

With regard to the above examples of operational protocols, it is anticipated that those skilled in the art will recognize numerous other examples of cartridge identification information and methods of employing the same in a tape cartridge leader according to the principles of the present invention. Thus, it should be expressly understood the above-examples are set forth for purposes of illustration and not limitation. As a result, the invention is not limited to the specific examples and illustrations discussed above, but only by the following claims and their equivalents.

We claim:

1. A method for determining, in a tape handling device, a format of a single reel tape cartridge from a plurality of potential formats, the method comprising:

receiving a single reel tape cartridge in a tape handling device;

obtaining information from a tape cartridge leader connected to a tape media;

identifying a format of the tape cartridge from a plurality of potential formats using the information;

determining the tape cartridge is incompatible with the tape handling device, wherein determining comprises determining the tape cartridge is incompatible with the tape handling device prior to winding the tape media past a tape head in the tape handling device; and ejecting the tape cartridge from the tape handling device.

2. The leader of claim 1, wherein the information is located on the leader at a predetermined location to permit overlay of the information by the leader during winding to prevent print through of the information onto the tape media.

3. The method of claim 1, wherein the step of identifying the format comprises:
identifying a format of the tape media.

4. The method of claim 1, the method comprising:
determining the tape cartridge is compatible with the tape handling device; and
winding the tape media from the tape cartridge to a read/write position in the tape handling device.

5. The method of claim 1, wherein the step of identifying the format comprises:
identifying a layout of the tape cartridge.

6. The method of claim 1, wherein the obtaining step comprises:
sensing at least one feature on the tape cartridge leader.

7. The method of claim 6, wherein the sensing step comprises:
sensing at least one aperture in the tape cartridge leader.

8. The method of claim 6, wherein the identifying step comprises:
identifying the format of the tape cartridge based on the at least one sensed feature.

9. The method of claim 6, wherein the obtaining step comprises:
sensing a plurality of features on the tape cartridge leader.

10. The method of claim 9, the method comprising:
measuring at least two distances between first, second, and third features on the tape cartridge leader, wherein the identifying step comprises identifying the tape cartridge based on the at least two distances.

11. The method of claim 9, the method comprising:
measuring a distance between first and second sensed features on the tape cartridge leader, wherein the identifying step comprises identifying the tape cartridge based on the distance.

12. A method for preventing damage to one of a tape handling device and a single reel tape cartridge due to incompatibility, the method comprising:
receiving a tape cartridge in a tape handling device;
connecting a tape cartridge leader to the tape handling device;
in the tape handling device, sensing information on the tape cartridge leader;
in the tape handling device, determining if the tape cartridge is compatible with the tape handling device using the information;
if the tape cartridge is incompatible, ejecting the tape cartridge from the tape handling device, wherein ejecting comprises ejecting the tape cartridge prior to winding a tape media in the tape cartridge past a tape head.

13. The method of claim 12, the method comprising:
subsequent to the connecting step, winding the connected leaders onto a take-up reel.

14. The method of claim 12, the method comprising:
winding the tape media to a read/write position adjacent the tape head if the tape cartridge is compatible.

15. A tape handling device comprising:
a processor;
a sensing system;
cartridge format identification software operational when executed on the processor to direct the sensing system to obtain information from a tape cartridge leader and identify a format of the tape cartridge from a plurality of potential formats using the information; and
a software storage medium operational to store the cartridge format identification software,
wherein the software is operational when executed on the processor to determine the tape cartridge is incompatible with the tape handling device and cause the tape handling device to eject the tape cartridge, and wherein the software is operational when executed on the processor to determine the tape cartridge is incompatible with the tape handling device prior to winding the tape media past a tape head in the tape handling device.

16. The device of claim 15, wherein the software is operational when executed on the processor to determine the tape cartridge is compatible with the tape handling device and cause the tape handling device to wind the tape media from the tape cartridge to a read/write position adjacent a tape head in the tape handling device.

17. The device of claim 15, wherein the software is operational when executed on the processor to measure a distance between a first and second feature on the tape cartridge leader and identify the tape cartridge based on the distance.

18. The device of claim 15, wherein the software is operational when executed on the processor to measure at least two distances between first, second, and third features on the tape cartridge leader and identify the tape cartridge based on the at least two distances.

* * * * *